United States Patent [19]

Maeda et al.

[11] Patent Number: 5,263,011
[45] Date of Patent: Nov. 16, 1993

[54] OPTICAL RECORDING AND REPRODUCING APPARATUS AND RECORDING MEDIUM HAVING MULTILAYER RECORDING MEMBRANES

[75] Inventors: Masataka Maeda, Hirakata; Kenzou Ishibashi, Moriguchi, both of Japan

[73] Assignee: Matsushita Electric Industrial Co., Ltd., Osaka, Japan

[21] Appl. No.: 785,104

[22] Filed: Oct. 30, 1991

[30] Foreign Application Priority Data

Nov. 1, 1990 [JP] Japan ................................ 2-297988
Aug. 29, 1991 [JP] Japan ................................ 3-218344

[51] Int. Cl.$^5$ .............................................. G11B 7/00
[52] U.S. Cl. .................................. 369/44.27; 369/94; 369/283; 369/275.30; 369/116; 369/44.29
[58] Field of Search ............. 369/94, 95, 44.27, 44.29, 369/54, 116, 272, 280, 283, 284, 274, 275.3, 275.4, 276, 286

[56] References Cited

U.S. PATENT DOCUMENTS

| | | | |
|---|---|---|---|
| 4,337,532 | 6/1982 | Oprandi et al. | 369/94 |
| 4,755,980 | 7/1988 | Yoshimaru et al. | 369/44.29 |
| 4,982,397 | 1/1991 | Yokota | 369/54 |

Primary Examiner—Aristotelis Psitos
Assistant Examiner—P. W. Huber
Attorney, Agent, or Firm—Wenderoth, Lind & Ponack

[57] ABSTRACT

An optical recording and reproducing apparatus stably set the gains (focus, tracking) corresponding to the respective layers at the insertion time of a recording medium having a multilayer record membrane. The optical recording and reproducing apparatus uses a recording medium having a multilayer membrane construction wherein the recording membranes are formed in a stage shape, is not superposed in the inner periphery or the outer periphery with respect to the laser transmission side, and has a circuit for detecting the number of the recording membranes, and a circuit for switching to a focus gain or a tracking gain in conformity with the recording medium, and a focus driving circuit for effecting a focus drawing-in operation. The driving circuits are driven so that they may be rotated or run into a condition of effecting capable of focus drawing-in operation, and thereafter the focus drawing-in operation is effected in the specific position of the recording medium.

4 Claims, 6 Drawing Sheets drive order waveform
of object lens focus error
waveform

S-character comparator
output
(Vref or Vrefn)

drive order waveform of object lens focus error waveform (middle)

comparator output focus error signal (outside or middle)

comparator output

Fig. 6(a)
drive order waveform
of object lens
Fig. 6(b)
focus error waveform
(middle)
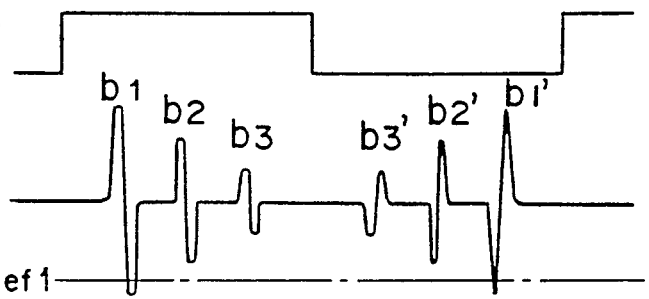
Fig. 6(c)
comparator output
Fig. 6(d)
focus error signal
(outside or middle)
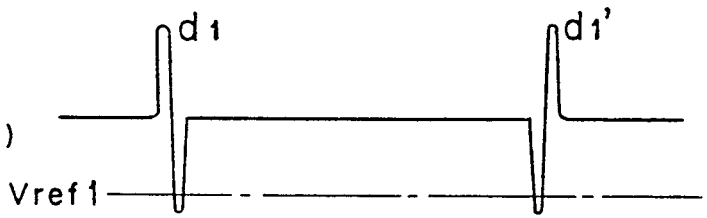
Fig. 6(e)
comparator output

OPTICAL RECORDING AND REPRODUCING APPARATUS AND RECORDING MEDIUM HAVING MULTILAYER RECORDING MEMBRANES

BACKGROUND OF THE INVENTION

The present invention generally relates to an optical recording and reproducing apparatus provided with a focus drawing-in function, a function of detecting the reverse insertion of a recording medium having of a multilayer recording membrane or an AGC circuit function corresponding to a multilayer recording membrane on the inner periphery and the outer periphery of the recording medium from the same layer direction during recording and reproducing one a recording medium having a multilayer recording membrane.

One embodiment of the conventional optical recording and reproducing apparatus will be described hereinafter with reference to the drawings. FIG. 4 is a block diagram showing the basic construction of the conventional optical recording and reproducing apparatus. In FIG. 4, reference numeral 1 denotes an optical disk used as a recording medium, and reference numeral 2 denotes a disk motor for rotating the optical disk 1. Reference numeral 3 denotes an optical head for recording signals on an optical disk with a laser and for also reproducing signals recorded on the optical disk 1. The optical head is composed of a semiconductor laser, an optical system, an object lens, a driving actuator comprising an object lens driving means, a focus error detecting system comprising a focus error detecting means, a tracking detecting system for detecting the errors of the laser spot and the tracking position, and a signal detecting system. The optical beams transmitted from the above described semiconductor laser are focused with an object lens, reach the optical disk recording membrane face where the reflected optical beams reach an optical detector for error detection use. In the optical detector, the lag in the focus direction and the lag in the tracking direction are detected, and the object lens is driven by an actuator so as to correct the lag in each direction within the given value. Reference numeral 4 denotes a linear actuator which is composed of a carriage on which the optical head 3 is mounted, a coil, a magnet, a yoke and a rail for carriage use. The linear actuator 4 moves the optical head 3 to a target position in a diametrical direction of the optical disk 1. Reference numeral 5 denotes an amplification circuit for amplifying the output signals from the signal detecting circuit of the optical head 3; reference numeral 6 denotes a semiconductor laser driving circuit used as a laser control circuit; reference numeral 14 denotes an amplification circuit used for focus error detection; reference numeral 15 denotes an amplification circuit for amplifying the output signals from the optical detector and used for tracking error detection; reference numeral 7 denotes a circuit used for groove sectional detection, which is adapted to operate a linear actuator after the focus drawing-in completion so as to detect the groove sectional signal. With a change-over switch 17 of the S-character drawing-in circuit and a focus control circuit after the detection, the switching operation is effected to the focus control circuit. Reference numeral 8 denotes a disk motor driving control circuit. Reference numeral 9 denotes a signal processing circuit which is adapted to feed a reproduction signal of the information pit from the optical head 3 amplified by the amplification circuit 5 of the signal detecting circuit, as a binary data, to the driving control circuit 13. During recording, the output of the laser light is applied to the disk face of the optical disk 1 in accordance with the signal from the driving control circuit 13 to be described later in a recording power mode so as to form a string of information pits on the recording face. Also, during reproduction, the existence and absence of the information pits can be read by the amount of optical reflection with the output of the laser beams being in a reproduction power mode. Reference numeral 10 denotes a driving circuit of the linear actuator 4 wherein the high speed movement of the optical head 3 to the target position is controlled by a position signal and by a speed signal detected by the optical detector of the optical head 3. Reference numeral 11 denotes a focus control circuit, and reference numeral 12 denotes a tracking control circuit. Reference numeral 16 denotes an S-character comparator circuit for use during the focus drawing-in operation time.

The above described driving control circuit 13 receives the instructions from the controllers of the above described respective control circuits and so on to execute and control the respective operations and to input execution commands to the respective controllers.

The optical operation of the recording and reproducing apparatus constructed as described hereinabove is described hereinafter. First, a disk 1 is engaged on a disk motor 2. The instructions from the driving control circuit 13 control the rotational speed of the disk motor 2 so as to be at a constant rate. The semiconductor laser of the optical head 3 is controlled by the semiconductor laser driving circuit 6 with the instructions from the driving control circuit 13. Further, the focus drawing-in operation is effected with the instructions from the driving control circuit 13. In the focus drawing-in operation, the focus control circuit is operated with the instructions from the driving control circuit 13 so as to drive the lens vertically, so that the focus error signals are formed with the light reflected from the disk recording face. Namely, the S-character curves of the focus error signal are outputted with the recording face being provided within the focus depth of the laser beam. The focus is detected from the focus error signal using the comparator circuit 16. Thereafter, the linear actuator 4 is driven into the inner periphery or the outer periphery with instructions from the driving control circuit 13 so as to detect the tracking error signal (groove sectional signal) using the groove sectional detecting circuit 7. Thereafter, the detected information is fed to the driving control circuit 13. Then, by the driving control circuit 13, a focus drawing-in changeover switch 17 is turned off to operate the focus servo system. Then, the control in the tracking direction is effected by the tracking control circuit 12. The feeding operation of the optical head 3 at this time is effected by a driving circuit 10 using the linear actuator 4. After the focus, tracking control operation is effected by the focus control circuit 11 and the tracking control circuit 12, the detected signal is amplified by the amplification circuit 5 of the signal detecting circuit and is fed to the signal processing circuit 9 where it is changed into a binary signal by the signal processing circuit 9 and is fed to the driving control circuit 13.

In the conventional construction as described hereinabove, when the laser is driven in the same laser direction during recording and reproducing on a recording medium having a multilayer record membrane, the focus error signal is outputted using the light reflected from the disk recording face during the focus drawing-in operation time, so that it is impossible to detect the position of the given recording membrane which is to be recorded or reproduced. Thus, during the recording and reproducing on the recording medium having a multilayer recording membrane, there is a problem in that the position of the given recording membrane cannot be ascertained.

SUMMARY OF THE INVENTION

Accordingly, the present invention has been developed with a view to substantially eliminating the above discussed drawbacks inherent in the prior art and has for its essential object to provide an optical recording and reproducing apparatus.

Another important object of the present invention is to provide an optical recording and reproducing apparatus which normally detects the recording membrane number prior to the information being recorded on to the optical disk so that the recording of the information on the optical disk and the binary conversion of the reproduced signal from of the information pits may be stably effected.

Also, although the recording and reproduction can effected from the same direction as in the conventional method using a recording medium having a multilayer recording membrane, the detection of the reverse insertion of the recording medium is a problem.

Still another object of the present invention is to provide an optical record reproducing apparatus which is adapted to stably detect the reverse insertion normally at the insertion time of a recording medium having a multilayer recording membrane.

Further, the gains (focus, tracking etc.) corresponding to each layer cannot be set the conventional method in using a recording medium having a multilayer recording membrane.

A further object of the present invention is to provided an optical record reproducing apparatus which is adapted to stably always set the gains (focus, tracking) corresponding to the respective layers at the insertion time of a recording medium having a multilayer recording membrane.

In accomplishing these and other objects, according to one preferred embodiment of the present invention, there is provided an optical recording and reproducing apparatus wherein a recording medium having a multilayer membrane is of a construction where the recording membranes are formed in a stage shape, and are not superposed in the inner periphery or the outer periphery with respect to the laser transmission side, a circuit for detecting the number of recording membranes, a circuit for switching to a focus gain, a tracking gain in conformity to the recording medium, and a focus driving circuit for effecting a focus drawing-in operation are driven so that the recording medium may be rotated or run into a condition which is capable of allowing a focus drawing-in operation, and thereafter, the focus drawing-in operation is effected in the specific position of the recording medium.

In a specific position where the recording membranes are not superposed and in a position where the recording membranes are not superposed on the inner periphery or the outer periphery of the recording medium when the same focus drawing-in operation is effected using the above described recording medium, the focus drawing-in operation is effected to effect the detection of the reverse insertion of the recording medium whether or not the recording membrane is the same using the level difference of the S-character amplitude of the recording membrane and whether or an address which is capable of being read exists after the tracking drawing-in operation.

Further, the gains (focus, tracking) setting operation corresponding to each layer of the above described recording medium is effected in accordance with the S-character amplitude level difference of the recording membranes.

In the present invention of the above described construction, after the starting of the recording medium, in the specific position of the same medium, for example, in a position of radius existing with the recording membrane which is to be reproduced being provided as a first layer if an optical disk having a multilayer membrane is used as the recording medium, the focus drawing-in operation is effected from the same layer direction, and the S-character amplitude level difference of the recording membrane is detected, and the gains (focus, tracking) can be set in accordance with the respective layers of the above described recording medium, so that the capacity of the disk may be made larger without the front to rear exchange of the disk.

Also, in a specific portion where the recording membranes are superposed and in a position where the recording membranes are superposed and in a position where the recording membranes are superposed on the inner periphery or the outer periphery after the starting operation of the recording medium by the above described construction, the focus drawing-in operation is compared with, or with the address, the reverse insertion of the recording medium can be detected.

BRIEF DESCRIPTION OF THE DRAWINGS

These and other objects and features of the present insertion will become apparent from the following description taken in conjunction with the preferred embodiment thereof with reference to the accompanying drawings, in which;

FIGS. 6(a)-6(e) are major waveform charts in the chart detection at the multilayer face reverse insertion time of an embodiment of the present invention.

DETAILED DESCRIPTION OF THE INVENTION

Figure 1:
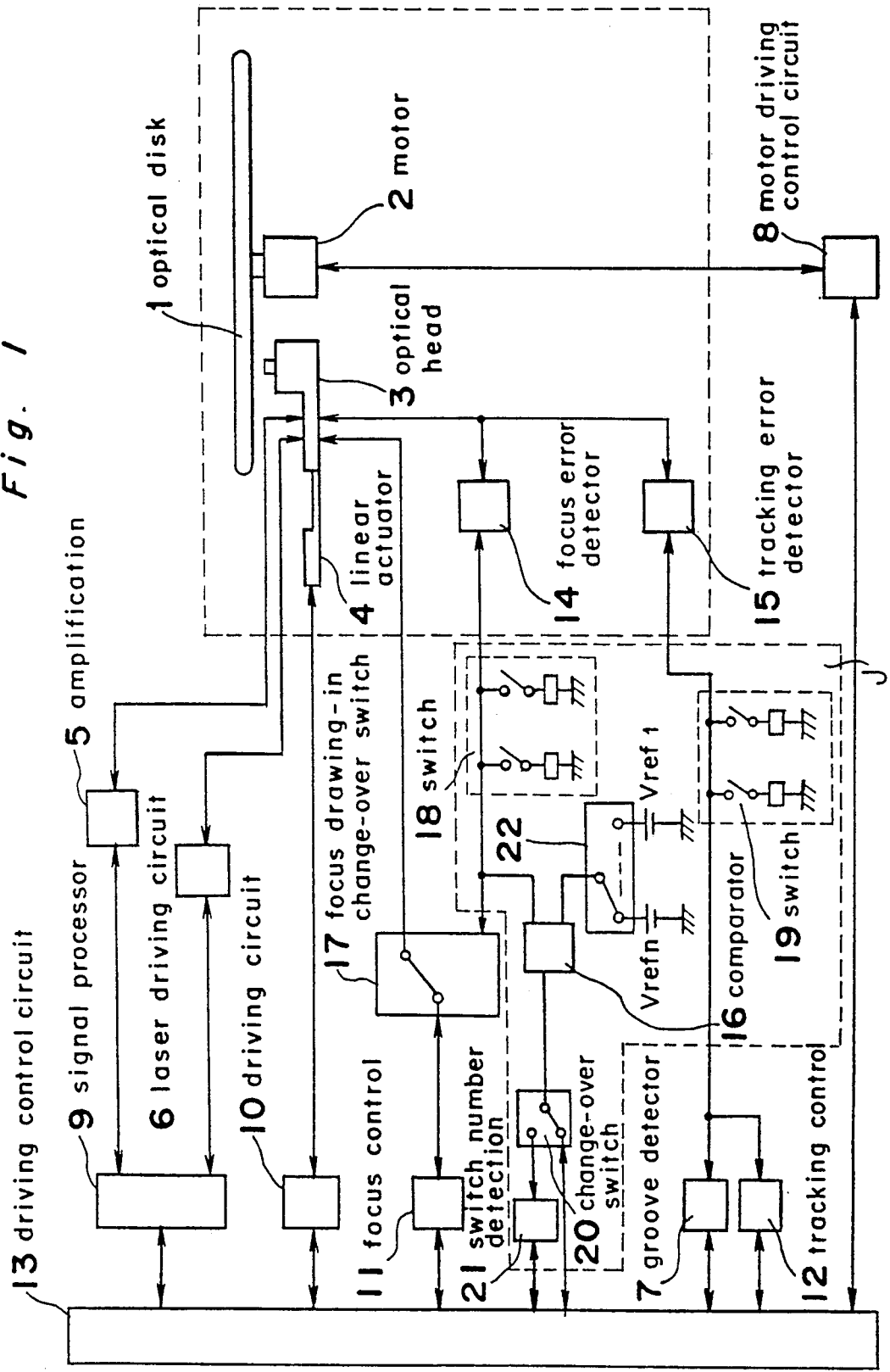
FIG. 1 is a block diagram of an optical recording reproducing apparatus in accordance with an embodiment of the present invention.

Before the description of the present invention proceeds, it is to be noted that like parts are designated by like reference numerals throughout the accompanying drawings.

Referring now to the drawings, there is shown in FIG. 1, an optical recording and reproducing apparatus according to one embodiment of the present invention, wherein element J is composed of a circuit 21 for effecting a focus drawing-in operation on an intermediate frequency of a recording medium to output S characters for detecting the number of S characters at the time of the recording medium using multilayer recording membranes, a S-character number detecting circuit changeover switch 20 for switching to one position in which it is connected to the S-character number detecting circuit 21 and to another position in which it is not connected to it, switches 18 and 19 for receiving the instructions from a driving control circuit 13 so as to switch the position of the recording membrane to be recorded and reproduced into the gains of the focus, tracking error signals which were in the recording membrane of the position.

The operation of the optical recording and reproducing apparatus provided with above-described detecting circuit of multilayer recording membranes and gain change-over switches 18 and 19 of focus, tracking error signals is described hereinafter. After the engagement of an optical disk 1 onto a disc motor 2, the driving control circuit 13 causes a disk motor driving control circuit 8 to keep the rotational speed of the disc motor constant.

With the instructions from the driving control circuit 13, the semiconductor laser of the optical head 3 is controlled so as to be at the reproduction power level by a semiconductor laser driving circuit 6.

The optical head 3 is transmitted onto the intermediate periphery of the optical disk 1. The feed of the optical head 3 is effected a driving circuit 10 with using a linear actuator 4. In order to detect the number of recording membranes from the driving control circuit 13, a path of the S-character number detecting circuit 21 is provided by a S-character number detecting circuit change-over switch 20, the lens of the optical head 3 is vertically oscillated so as to output the S-character waveform of the recording membrane. The S-character is detected by a comparator for S-character detection 16 so as to detect the number by the S-character number detecting circuit 21. To effect the focus drawing-in operation to a position of the recording membrane of the target, a Vref change-over switch 22 for S-character comparator circuit use is set position in the Vrefn in accordance with the driving control circuit 13, and thereafter the comparator level is set in the Vref position of the recording membrane of the target. When the recording membrane of the target is in conformity with the S-character number count, the S-character detecting circuit change-over switch 20 is switched to a path which does not pass a S-character character number detecting circuit 21 so as to change the setting of the gain change-over switches 18 and 19 so that the gain is in agreement with the position of the recording membrane for reproducing and recording.

Figure 2:
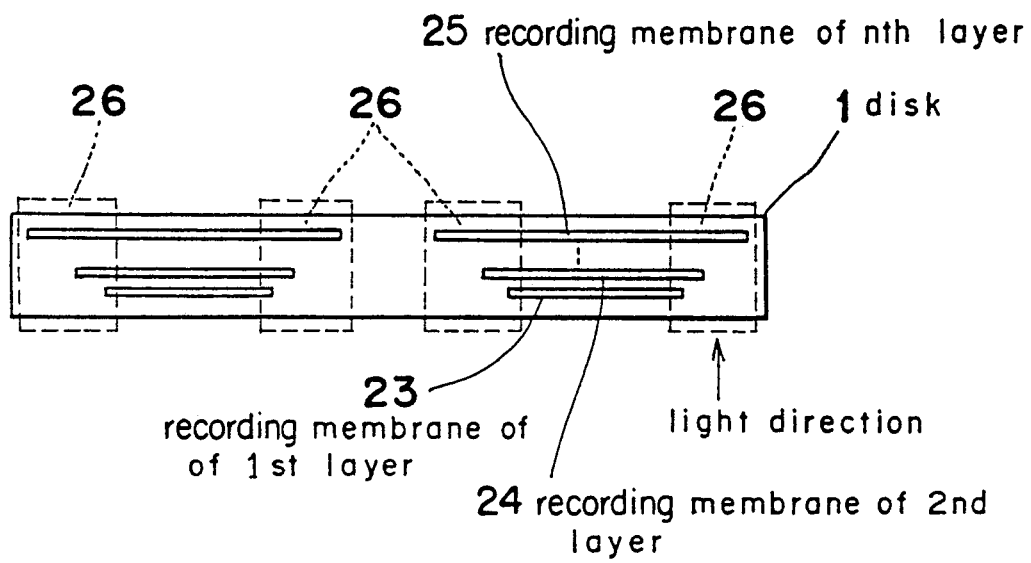
FIG. 2 is a sectional view of an optical disk of a multilayer recording membrane.

Further, the optical head 3 is fed onto the maximum outer periphery or the maximum inner periphery of the optical disk 1. The feeding of the optical head 3 is effected by a driving circuit 10 using the linear actuator 4. After the feeding of the optical head 3, the focus drawing-in operation is effected at a specific position. The focus drawing-in operation is effected in a specific position where the shape is of stairs with no recording membranes being provided on the lens side of the recording membranes. FIG. 2 shows a sectional view of the multilayer recording membranes.

When the drawing-in operation has been effected on the outer periphery with the linear actuator 4 after the focus drawing-in operation completion, the optical head 3 is moved to an inner peripheral direction (an outer peripheral direction when the drawing-in operation has been effected on the inner periphery). After the detection of the groove sectional signal has been detected with a tracking error signal, the focus drawing-in change-over switch 17 is switched to a focus servoloop so as to effect the focus control.

After the tracking control operation has been effected by the tracking control circuit 13, the signal detection is amplified by an amplification circuit 5 so as to feed the signal to a signal processing circuit 9. The signal is binary-coded and is fed to the driving control circuit 13. Thus, the optical recording and reproducing apparatus is put into a reproducing condition.

The waveform examples in the detection of the face number of the multilayer record membranes from the above described focus error will be described with reference to FIGS. 3(a)-3(c).

Figure 3A:
FIG. 3(a)-3(c) are is a major waveform charts in the multilayer face detection in accordance with an embodiment of the present invention.
Figure 3B:
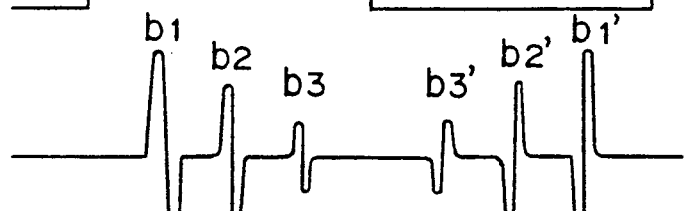
Figure 3C:
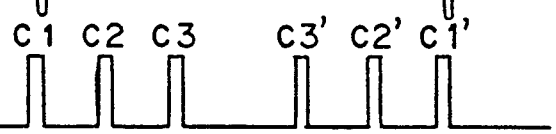
Figure 4:
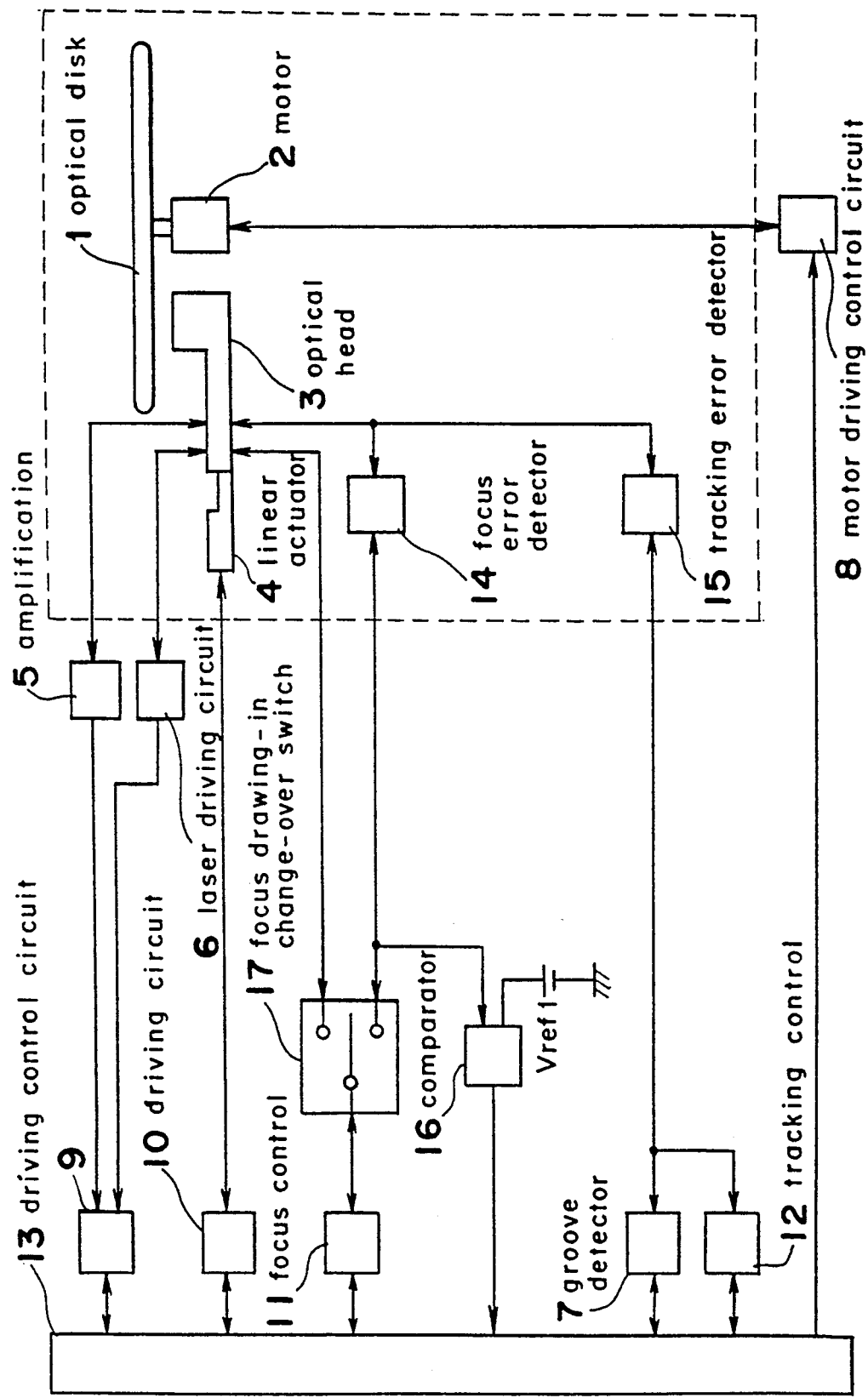
FIG. 4 is a block diagram showing the basic construction of the conventional optical recording and reproducing apparatus.

FIGS. 3(a)-3(c) detection waveform examples in the major points when the optical head 3 is moved onto the intermediate periphery of the optical disc with all the multilayer membranes being superposed so as to have the object lens above and below.

FIG. 3(a) is a driving instruction waveform of an object lens to be outputted from the driving control circuit 13. It is an instruction signal for driving the object lens in a direction away from the optical disk at the low level, while the object lens faces the optical disk at the high level. FIG. 3(b) is a focus error waveform of the output of the focus error detecting circuit 14 where the S-character waveforms b3 through b3, b1' through b3' are changed, with +, − peaks being provided in the positions near the recording membranes, and the polarity changing with the direction of the relative movement of the object lens and the recording membranes. The S-character waveform of the recording membrane located in a position away from the object lens because of the superposed recording membranes becomes smaller in amplitude, because the incident light is absorbed or scattered by the recording membranes on this side.

FIG. 3(c) is a S-character comparator output from a S-character comparator circuit 16, where the S-character waveform is pulse-coded in the approximately zero crossing position of the above described focus error signal so as to detect c1 through c3 and c1' through c3'.

The face number of the multilayer recording layers of the engaged disk can be detected through the counting, by a S-character number detecting circuit 21, of the S-character comparator output of the FIG. 3(c) gated with the object lens driving instructions of the above described FIG. 3(a) waveform. A three-layer multilayer membrane provided can be detected in the embodiment of FIGS. 3(a)-3(c).

A disk radius position where the focus drawing-in operation is effected, and the gain after the drawing-in operation can be decided in advance by the detection of the above described face number.

Although a method of detecting the face number from the disk after the engagement has been described, a method of effecting the recording and reading operations with information on the numbers and so on of bar codes and detection holes in a cartridge with a disk being accommodated in it can be provided. The above described face number information can be recorded in the special position of the disk face, can be read with the optical head, and can be read with a reflection type optical sensor or the like.

According to the embodiment, an optical head 3 is moved onto the intermediate periphery of the optical disk 1 with a linear actuator 4 after light has been emitted from the laser so as to detect the number of the layers in optical disk 1. Thereafter, the recording membrane of the object is detected with the S-character level difference so as to effect an switching operation to a focus, a tracking servogain corresponding to the membrane. The moving operation is effected again with the optical head 3 onto the maximum outer periphery or the maximum inner periphery of the optical disk 1 by the linear actuator 4, so that the optical disk of the multilayer record membrane can be always reproduced from the same direction with the focus drawing-in operation.

The detection of the reverse insertion of the optical disk of the optical disk of the multilayer recording membrane will be described hereinafter with reference to FIGS. 5(a)-5(e) and FIGS. 6(a)-6(e).

FIGS. 5(a)-5(e) are major detecting waveform examples during at the normal insertion of the optical disk.

Figures 5A, 5B, 5C, 5D, 5E:
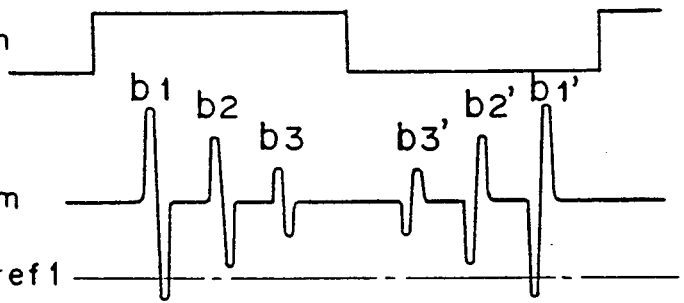
FIGS. 5(a)-5(e) are main waveform charts in a chart detection at the multilayer face insertion time of an embodiment of the present invention.

FIG. 5(a) is a driving instruction waveform of an object lens to be outputted from the driving control circuit 13. It is an instruction signal for driving the object lens in a direction away from the optical disk at the low level, while the object lens faces the optical disk at the high level. FIG. 5(b) is a focus error waveform of the output of the focus error detecting circuit 14 which is detected wherein S-character waveforms b1 through b3 and b1' through b3', with + and − peaks are provided in the positions near the recording membranes, and the polarity changing with the direction of the relative movement of the object lens and the recording membranes. The S-character wave form of the recording membrane located in a position away from the object lens because of the superposed membranes becomes smaller in amplitude, because the incident light is absorbed or scattered by the recording membranes on this side. FIG. 5(c) is an S-character comparator output from a S-character comparator circuit 16, where the above described focus error signals are pulse-coded in the S-character waveform with the comparator level Vref1 of a first layer of recording membrane 23 on the lens side so as to detect c1 and c1'. The optical head 3 is fed to the inner periphery or the outer periphery (specific location where the multilayer recording membranes are not superposed) of the optical disk 1 with instructions from the driving control circuit 13. The feeding operation of the optical head 3 is effected by a driving circuit 10 using a linear actuator 4. At this time, the switching operation is effected from the driving control circuit 13 to a route of the S-character number detecting circuit with a S-character detecting circuit change-over switch. Also, after the Vref has been switched to a Vref1 which serves for detection of the reverse insertion of the optical disc with a S-character comparator Vref change-over switch 22, the lens of the optical head 3 is oscillated up and down so as to output the S-character waveform of the record membrane. The S-character detection is effected by a comparator for S-character detection 16 so as to detect the number by the S-character number detection circuit. The vertical lens vibrations of the optical head 3 is stopped and the optical head 3 is moved, with instructions from the driving control circuit 13, onto the outer periphery direction or the inner peripheral direction using the linear actuator 4. At this time, the lens of the optical head 3 is oscillated vertically in a specific position where the shape is of stairs with no recording membranes being provided on the lens side of the recording membrane the S-character waveform of the recording membrane is outputted as shown in FIG. 5(d). FIG. (5e) condition where the S-character detection cannot be effected by a comparator for the S-character detection 16 so as to detect the number by the S-character number detecting circuit. The S-character number of the intermediate periphery of the above described optical disc 1 is compared with the S-character numbers of FIGS. 5(c) and 5(e) on the inner periphery or the outer periphery of the optical disk 1. If there is a difference between them, the Vref is switched for the S-character number counting by the S-character comparator Vref changeover switch 22, and thereafter, the switching operation is effected to a path of the S-character number detecting circuit by the S-character number detection circuit change-over switch 20 so as to continue the operation. If the S-character numbers are the same, then the optical disk 1 has been reversibly inserted and the driving control circuit 13 must issue a warning that the optical disk 1 requires discharging thereof and the optical disk 1 must be inserted correctly again. Thus, the optical record reproducing apparatus continues its operation after the reverse insertion of the optical disk 1 into the reproducing condition.

Although the optical disk has been described as an embodiment, it is possible to apply to an apparatus for having multilayer recording membranes like an optical card, optical tape and so on, and effecting the recording and reproduction of the information by using a radiant ray source such as a laser or the like.

A second embodiment of a method of detecting reversibly inserted optical disk in accordance with the present invention is described hereinafter with reference to the drawings.

Figure 7:
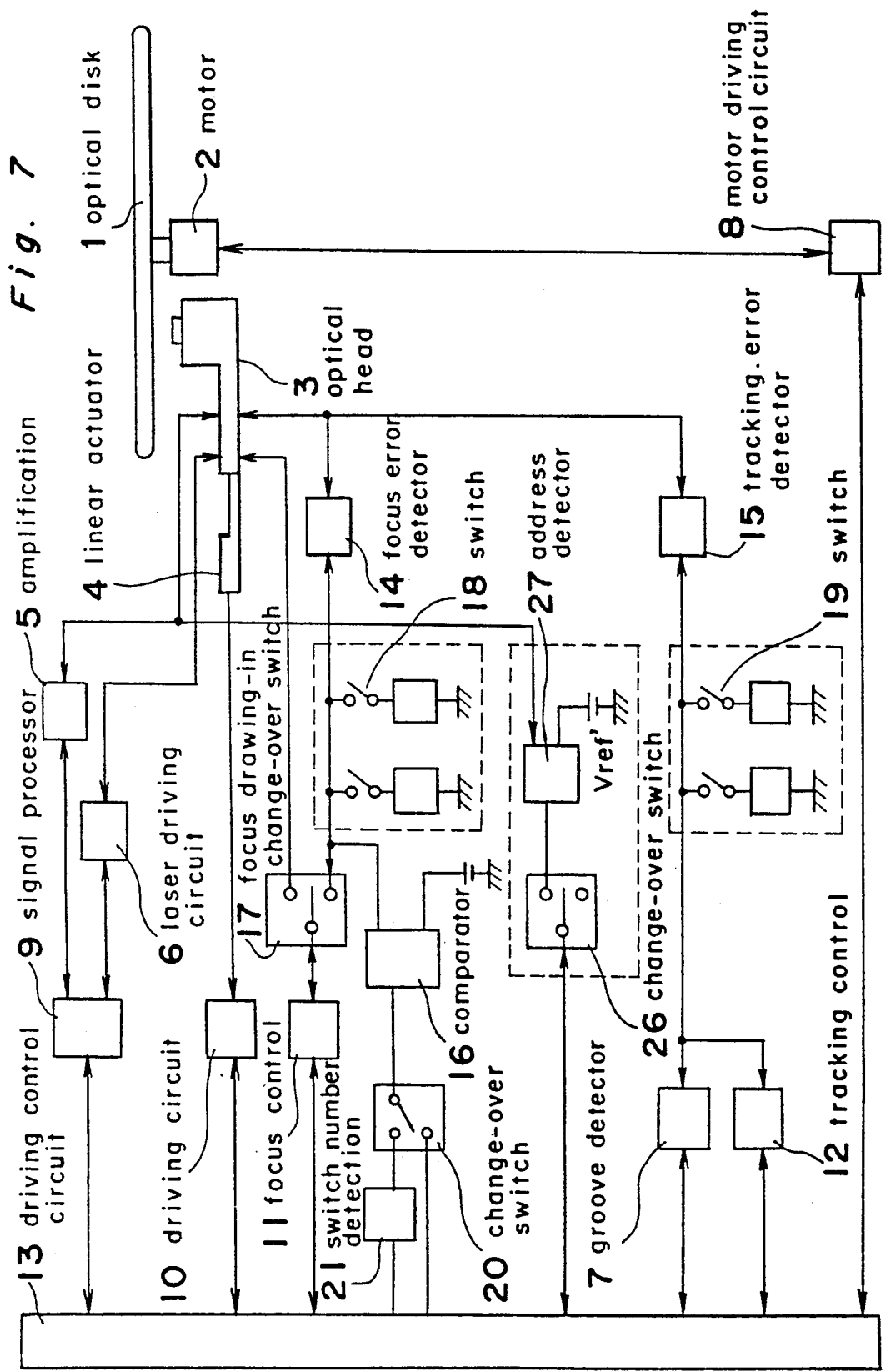
FIG. 7 is a construction view of a detection method of the reverse insertion of the optical disk.

In FIG. 7, the difference in construction from FIG. 1 is that the S-character comparator Vref change-over switch 22 is replaced by an address detecting circuit change-over switch 26 and an address detecting circuit 27. In accordance with the operations of an optical system recording and reproducing apparatus provided with a detecting circuit of the multilayer recording membrane, a gain change-over switch of a focus and tracking error signal, the tracking control operation is effected. Thereafter, the detecting signal of the recording medium reverse insertion is outputted by the driving control circuit 13. The switching operation is effected to a path of the address detection circuit by the address detecting circuit change-over switch 26 so as to detect the existence and absence of the address. When the optical disk has been reversibly inserted with the address being cut in the groove (or between grooves) of the optical disk 1, the address is not detected as the tracking control is applied in the groove (or between grooves) of the optical disk. When the address has been detected by the address detecting circuit 27, the path of the address detecting circuit is turned off by the address detecting circuit change-over switch 26 so as to return to the condition where the tracking control operation had been effected. The signal detection is amplified by the amplifying circuit 5 to feed the signal to the signal processing circuit 9. The signal is digitized so as to feed it to the drive control circuit 13. Here the optical recording reproducing apparatus is put into a reproducing condition. When the address cannot normally be detected, the optical disk 1 is dischanged by the drive control circuit 13, because the optical disk 1 has been reversibly inserted. The optical disk 1 is correctly inserted again.

As is clear from the foregoing description, according to the arrangement of the present invention, the optical system recording and reproducing apparatus and the recording medium of the present invention detects the number of the recording membrane layer in the specific position of the above described recording medium after the starting operation of the multilayer medium so that the recording medium may be caused to rotate or run into a possible recording or reproduction possible condition. After the switching operation of the focus, the tracking servogain has been switched so that the focus may be applied upon the recording membrane to be reproduced, a means for causing the focus drawing-in operation to be effected in a position corresponding to the recording membrane to be reproduced in a certain other specific position, with an superior effect of stably effecting the recording and reproduction from the same direction even in a multilayer recording membrane.

Also, the optical record reproducing apparatus and the recording medium of the present invention has superior effect in that the detection of the reverse insertion of the recording medium may be also effected.

What is claimed is:

1. An optical recording and reproducing apparatus comprising:
   a recording medium having multilayer recording membranes, which are capable of being recorded thereon or reproduced therefrom from the same surface of the medium by a laser, said membranes being arranged within the medium for intervals at a plurality of planes, and at least one of the recording membranes having a portion which fails to overlap any other of the recording membranes for a certain range at one end of the recording membrane when viewed from a laser injecting side of the recording medium;
   a head for recording signals on or for reproducing recorded signals from the recording medium;
   a head moving means for changing a position of the head on the recording medium;
   an object lens mounted on the head for forming a laser spot focused on the recording membranes of the recording medium;
   an object lens driving means for moving the object lens in a vertical direction with respect to the recording medium;
   a focus error detecting means for detecting the positional relationship between the laser spot and the recording membranes by the light reflected from the recording membranes;
   a focus control means including a phase compensation circuit and a loop switch which are inserted between the focus error detecting means and the object lens driving means;
   a laser control circuit for controlling a laser power of the head;
   a count means for counting the pulses derived from an output of the focus error detecting means; and
   a recording medium driving means for providing a relative motion between the recording medium and the head;
   wherein, after the recording medium is driven by the recording medium driving means at a relative speed between the recording medium and the head enabling recording and reproducing, laser light is emitted under the control of the laser control circuit and the object lens is driven up and down towards the recording medium by the object lens driving means so that the number of membrane planes of the recording membranes is detected by an output of the count means during the up and down movement of the object lens, and thereafter, the head is moved to a certain position, where the recording membranes fail to overlap, and the object lens is moved up and down to effect a focus drawing operation, whereby the loop switch is closed at the focus error signal position of the record membrane plane detected initially to draw in the focus control means.

2. An optical recording and reproducing apparatus as defined in claim 1, wherein the focus drawing operation is effected at a certain position wherein the recording membranes disposed at an inner periphery or an outer periphery of the recording medium fail to overlap each other, and wherein, after the four drawing operations the existence of an address being read-out is confirmed so as to detect the reverse insertion of the recording medium by the failure to read-out the address.

3. An optical recording and reproducing apparatus as defined in claim 1, wherein the gain setting for focus and tracking corresponding to each layer of the recording medium is effected in accordance with level difference of predetermined S shaped amplitudes of the recording membranes.

4. A recording medium having multilayer record membranes for use in an optical recording and reproducing apparatus, wherein the recording medium is constructed so that the recording membranes can be recorded on or signal reproduced from the same surface of the recording medium for intervals within the medium, and wherein the medium has a portion existing as a first recording membrane which fails to overlap any of the other recording membranes when viewed from a laser injecting side of the first recording membrane within a certain range of one end of the first recording membrane.

* * * * *